United States Patent
Uehara

(10) Patent No.: US 9,091,846 B2
(45) Date of Patent: Jul. 28, 2015

(54) DISPLAY DEVICE COMPRISING A LIGHT GUIDING UNIT HAVING A PLURALITY OF OPTICAL FIBERS THAT DIFFER IN LENGTH DEPENDING ON A PLURALITY OF IRRADIATION SURFACES

(71) Applicant: Japan Display Inc., Tokyo (JP)

(72) Inventor: Toshinori Uehara, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/109,115

(22) Filed: Dec. 17, 2013

(65) Prior Publication Data

US 2014/0176862 A1    Jun. 26, 2014

(30) Foreign Application Priority Data

Dec. 26, 2012 (JP) ................. 2012-283722

(51) Int. Cl.
*G02F 1/1335* (2006.01)
*G02B 27/01* (2006.01)
*G02B 6/06* (2006.01)

(52) U.S. Cl.
CPC .............. *G02B 27/0101* (2013.01); *G02B 6/06* (2013.01)

(58) Field of Classification Search
CPC .................................................. G02B 27/0101
USPC .......................................................... 349/11
See application file for complete search history.

(56) References Cited

U.S. PATENT DOCUMENTS

| 6,266,108 | B1 * | 7/2001 | Bao et al. ................. 349/63 |
| 6,407,785 | B1 * | 6/2002 | Yamazaki ................. 349/113 |
| 2011/0051029 | A1 * | 3/2011 | Okumura ................. 349/57 |

FOREIGN PATENT DOCUMENTS

| JP | 59-064813 | 4/1984 |
| JP | 60-021084 | 2/1985 |
| JP | 61-023191 | 1/1986 |
| JP | 2003-295116 | 10/2003 |
| JP | 2007-065011 | 3/2007 |
| JP | 2010-167830 | 8/2010 |
| JP | 2011-053386 | 3/2011 |

OTHER PUBLICATIONS

Notice of Rejection issued in connection with Japanese Patent Application No. 2012-283722, dated Apr. 28, 2015. (6 pages).

\* cited by examiner

*Primary Examiner* — Paul Lee
(74) *Attorney, Agent, or Firm* — K&L Gates LLP

(57) ABSTRACT

A display device includes a display panel having a display surface, a light guiding unit disposed at a display surface side of the display panel, the light guiding unit having an incident part and an irradiation part, the incident part being parallel to the display surface and facing the display surface, the irradiation part being parallel to the display surface and configured to emit a light entered from the incident part, the irradiation part having a plurality of irradiation surfaces whose positions in a direction orthogonal to the incident part differ depending on a position on the display surface, and a mirror configured to reflect an image projected from the display panel through the light guiding unit.

6 Claims, 8 Drawing Sheets

DISPLAY DEVICE COMPRISING A LIGHT GUIDING UNIT HAVING A PLURALITY OF OPTICAL FIBERS THAT DIFFER IN LENGTH DEPENDING ON A PLURALITY OF IRRADIATION SURFACES

CROSS REFERENCES TO RELATED APPLICATIONS

The present application claims priority to Japanese Priority Patent Application JP 2012-283722 filed in the Japan Patent Office on Dec. 26, 2012, the entire content of which is hereby incorporated by reference.

BACKGROUND

1. Field of the Invention

The present invention relates to a display device for displaying an image.

2. Description of the Related Art

As a display device, for example, there is known a head-up display (HUD) device which is disposed inside of a vehicle and which is designed to project an image displayed on a display unit on a front window (e.g. Japanese Patent Application Laid-open Nos. 2007-65011 and 2011-53386).

Technologies disclosed in Japanese Patent Application Laid-open Nos. 2007-65011 and 2011-53386 are for displaying a virtual image approximately vertically on a road surface. Recently, however, efforts have been made for displaying a virtual image on a road surface by means of a vehicle-mounted head-up display device. In order to display a virtual image approximately vertically on a road surface, it is enough to dispose a display device such as a liquid crystal display device approximately vertically to the road surface. In order to display a virtual image on a road surface, instead, those skilled in the art may consider inclining a display surface of a display device toward the road surface, for example. In this case, depending on the viewing angle of the display device, the virtual image may be displayed insufficiently, or the transmittance and contrast of the display panel may decrease. Japanese Patent Application Laid-open Nos. 2007-65011 and 2011-53386 does not disclose or suggest displaying any virtual image on a road surface. There is a need for a display device for displaying a virtual image on a road surface.

SUMMARY

It is an object of the present invention to at least partially solve the problems in the conventional technology.

There is provided a display device including a display panel having a display surface; a light guiding unit disposed at a display surface side of the display panel, the light guiding unit having an incident part and an irradiation part, the incident part being parallel to the display surface and facing the display surface, the irradiation part being parallel to the display surface and configured to emit a light entered from the incident part, the irradiation part having a plurality of irradiation surfaces whose positions in a direction orthogonal to the incident part differ depending on a position on the display surface; and a mirror configured to reflect an image projected from the display panel through the light guiding unit.

The present disclosure makes it possible to display a virtual image appropriately on a road surface by means of a vehicle-mounted head-up display device.

The above and other objects, features, advantages and technical and industrial significance of this invention will be better understood by reading the following detailed description of presently preferred embodiments of the invention, when considered in connection with the accompanying drawings.

The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

Additional features and advantages are described herein, and will be apparent from the following Detailed Description and the figures.

DETAILED DESCRIPTION

The present disclosure will now be described according to the following orders and with reference to the accompanying drawings.

1. Display Device
1-1. General Configuration
1-2. Light Guiding Unit
1-3. First Modification
1-4. Second Modification
1-5. Third Modification
2. Configuration of Present Disclosure

[1. Display Device]

<1-1. General Configuration>

Figure 1:
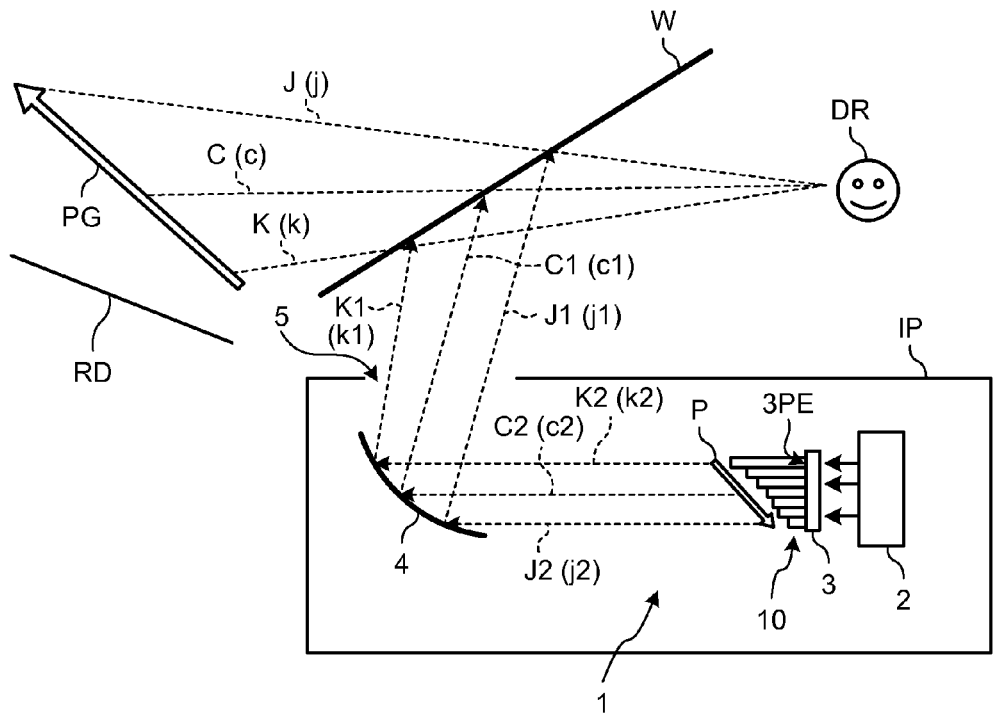
FIG. 1 is a schematic view illustrating a display device according to a present embodiment.
Figure 2:
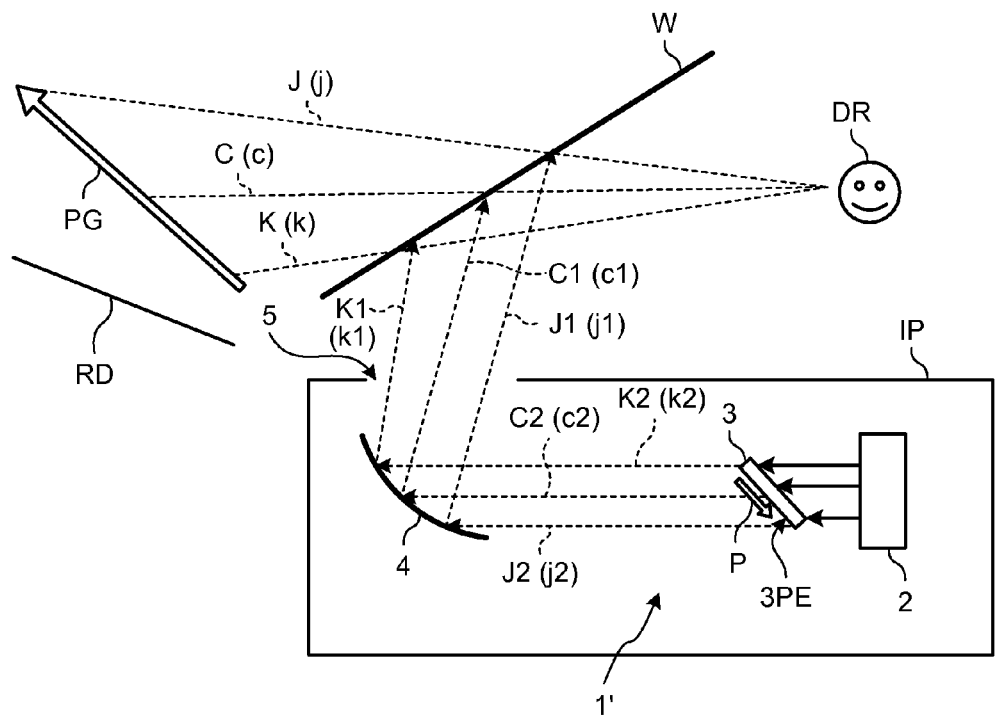
FIG. 2 is a schematic view illustrating a display device according to a comparative embodiment.

FIG. 1 is a schematic view illustrating a display device according to a preferred embodiment of the present disclosure. FIG. 2 is a schematic view illustrating a display device according to a comparable embodiment. In the preferred embodiment (hereinafter may be also called the present embodiment as appropriate), the display 1 is a head-up display device which is mounted on a vehicle such as car, bus, truck and the like, and which displays information on a front window W of the vehicle. By using the display device 1, a driver D of the vehicle can view the information displayed on the front window W, while he/she keeps his/her eyes on a front view.

The display device 1 is installed in a front panel IP of the vehicle. The display device 1 includes a light source 2, a display panel 3, a mirror 4, and a light guiding unit 10. The light source 2 may be, but not exclusively, a light emitting diode (LED) for example. The display device 3 may be, but not exclusively, a liquid crystal display panel (LCD panel) for example. The mirror 4 is a concave mirror. The light guiding unit 10 is disposed between the display panel 3 and the mirror 4. The light guiding unit 10 guides the light irradiated from a display surface 3PE to the mirror 4 for projecting an image P. The display device 1 has an opening 5 at a position facing both the front window W and the mirror 4.

The image P displayed on the display surface 3PE of the display panel 3 enters the light guiding unit 10 and then is irradiated from the light guiding unit 10 to the mirror to be projected. The image P projected from the display panel 3 through the light guiding unit 10 is reflected by the mirror 4 and then projected on the front window W through the opening 5. The mirror 4 magnifies the image P and projects the magnified image P on the front window W. Through the front window W, the driver DR views a virtual image PG of the image P projected by the display panel 3. In the present embodiment, the virtual image PG is displayed in a state almost parallel to a road surface RD. This is because a part of the light guiding unit 10 facing the mirror 4 has a step-like structure to project the image P on the mirror 4. The structure of the light guiding unit 10 will be described later. Since the virtual image PG is displayed in a state parallel to or almost parallel to the road surface RD, the driver DR feels as if the virtual image PG is displayed on the road surface. Therefore, the movement of the focal position of the driver DR is reduced.

Lengths of each light pass C, J, and K, i.e. light pass length c, j, and k from the driver DR to the virtual image PG follow the law of reflection and can be represented by the following mathematical equations.

$$c = c_1 + c_2 * A \quad (1)$$

$$j = j_1 + j_2 * A \quad (2)$$

$$k = k_1 + k_2 * A \quad (3)$$

In the aforementioned equations, A represents a magnification ratio of the mirror 4 using the concave mirror; $c_1$, $j_1$, and $k_1$ represent lengths (light pass lengths) of respective light passes C1, J1, and K1 from the mirror 4 to the front window W; $c_2$, $j_2$, and $k_2$ represent lengths (light pass lengths) of respective light passes C2, J2, and K2 from the irradiation surface of the light guiding unit 10 to the mirror 4.

In order to reduce an angle between a plane of the virtual image PG and the road surface RD so that the plane of the virtual image PG approaches the state parallel to the road surface RD, the light pass length j needs to be longer than the light pass length c, and the light pass length k needs to be shorter than the light pass length c. For that purpose, the light pass length j2 needs to be longer than the light pass length c2, and the light pass length k2 needs to be shorter than the light pass length c2. In the compared embodiment as illustrated in FIG. 2, the angle between the plane of the virtual image PG and the road surface RD is reduced by slanting the display panel 3 included in the display device 1 toward a direction so that the light pass length j2 becomes longer than the light pass length c2 and the light pass length k2 becomes shorter than the light pass length c2. When the display panel 3 is slanted as such, each light pass C2, J2, and K2 from the display surface 3PE of the display panel 3 to the mirror 4 is slanted relative to a direction orthogonal to the display surface 3PE.

When a liquid crystal display panel (LCD panel) is used as the display panel 3, the display panel 3 slanted in the display device 1' according to the comparative embodiment as illustrated in FIG. 2 is required to have a visual property for a slanting view. When the display panel 3 is disposed in a slanted manner, the transmittance or contrast of the display panel 3 may decrease. For that reason, the display panel 3 is preferably disposed so that each light pass C2, J2, and K2 from the display surface 3PE to the mirror 4 become as parallel as possible to the direction orthogonal to the display surface 3PE.

In the present embodiment, therefore, the display device 1 is configured so that each light pass C2, J2, and K2 from the display surface 3PE to the mirror 4 become parallel to the direction orthogonal to the display surface 3PE, as illustrated in FIG. 1. The light guiding unit 10 having the step-like structure facing the mirror 4 is disposed at a display surface 3PE side of the display panel 3, so that the light pass length k2 of the light pass K2 becomes shorter than the light pass length j2 of the light pass J2. As a result, the display device 1 can display the virtual image PG in a state parallel to or almost parallel to the road surface RD. Now, the light guiding unit 10 will be described in detail.

<1-2. Detail of Light Guiding Unit>

Figure 3:
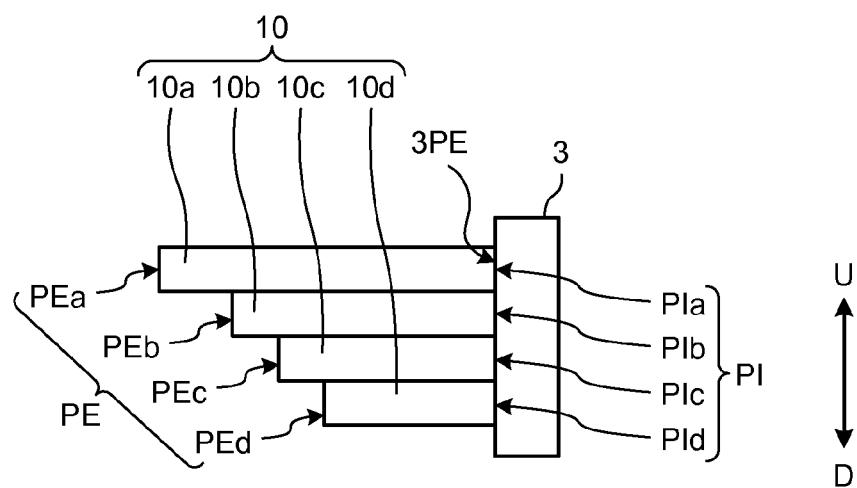
FIG. 3 is a side view illustrating a display panel and a light guiding unit included in the display device according to the present embodiment.
Figure 4:
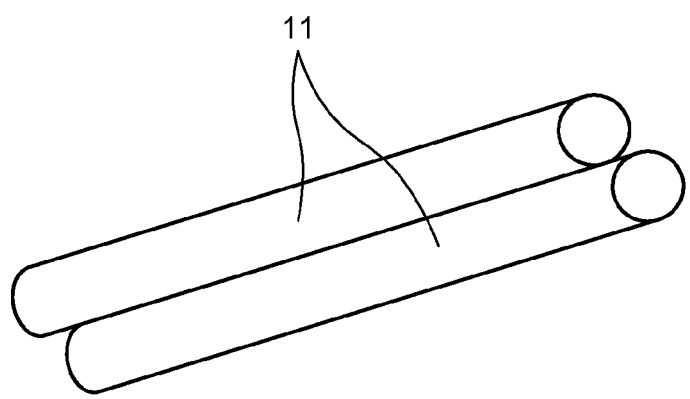
FIG. 4 is a schematic view illustrating optical fibers included in the light guiding unit.
Figure 5:
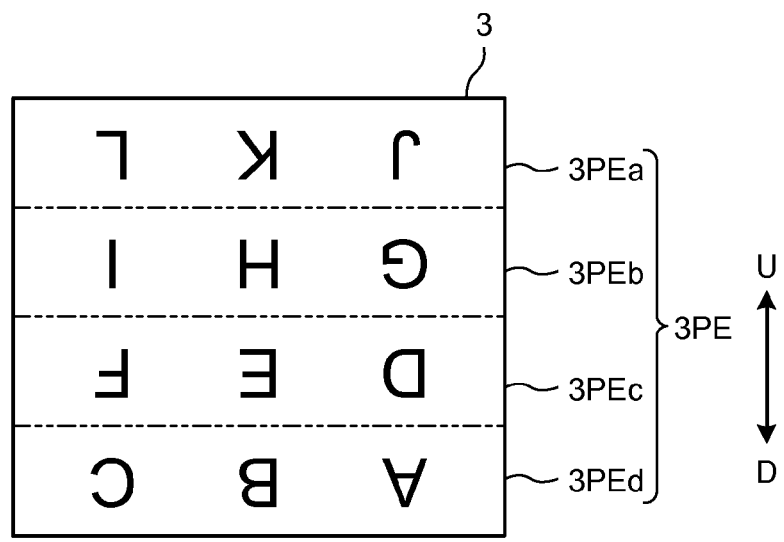
FIG. 5 is a schematic view illustrating an image displayed on a display surface of the display panel.
Figure 6:
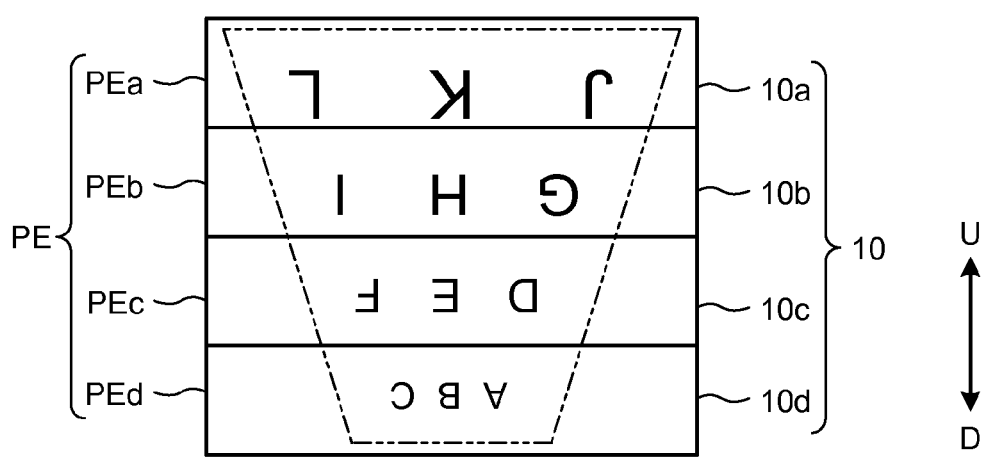
FIG. 6 is a schematic view illustrating an irradiation part of the light guiding unit.
Figure 7:
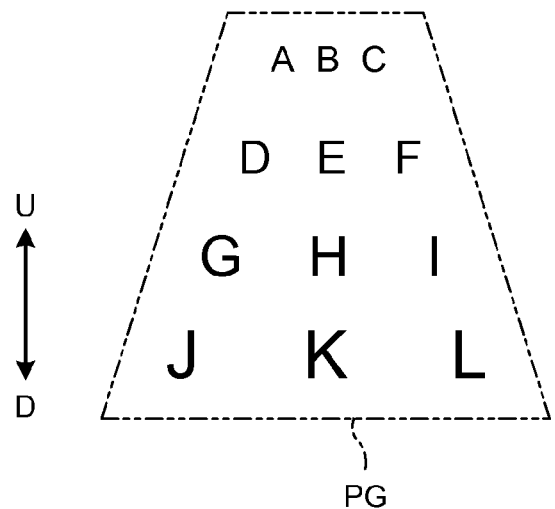
FIG. 7 is a schematic view illustrating a virtual image displayed by the display device according to the present embodiment.

FIG. 3 is a side view of the display panel and the light guiding unit included in the display device according to the present embodiment. FIG. 4 is a schematic view illustrating optical fibers included in the light guiding unit. FIG. 5 is a schematic view illustrating an image displayed on the display surface of the display panel. FIG. 6 is a schematic view illustrating an irradiation part of the light guiding unit. FIG. 7 is a schematic view illustrating a virtual image displayed by the display device according to the present embodiment. An alphabetical reference D represents a downward direction (i.e. gravitative direction) and an alphabetical reference U represents an upward direction (i.e. an opposite from the gravitative direction).

The light guiding unit 10 is disposed at the display surface 3PE side of the display panel 3. The light guiding unit 10 has an incident part (inlet side) PI and an irradiation part (exit side) PE. The incident part PI is parallel to the display surface 3PE and faces the display surface 3PE. The irradiation part PE irradiates or emits the incident light entered from the incident part PI. The irradiation part PE is parallel to the incident part PI. The irradiation part PE has a plurality of irradiation surfaces (emitting surfaces) PEa, PEb, PEc, and PEd. The plurality of irradiation surfaces PEa, PEb, PEc, and PEd are located at different positions in a direction orthogonal to the incident part PI, depending on positions on the display surface 3PE of the display panel 3. Specifically, the plurality of irradiation surfaces PEa, PEb, PEc, and PEd have different length from the incident part PI depending on the positions on the display surface 3PE of the display panel 3.

In the present embodiment, the light guiding unit 10 includes a plurality of light guiding members 10a, 10b, 10c, and 10d. Each of light guiding members 10a, 10b, 10c, and 10d has respective irradiation surface PEa, PEb, PEc, or PEd, and respective incident surface PIa, PIb, PIc, or PId. The plurality of incident surfaces PIa, PIb, PIc, and PId compose the incident part PI of the light guiding unit 10. Each of the light guiding members 10a, 10b, 10c, and 10d has a rectangular parallelepiped or cuboid structure in which each of irradiation surfaces PEa, PEb, PEc, and PEd faces respective incident surface PIa, PIb, PIc, or PId. Each irradiation surface PEa, PEb, PEc, or PEd is a plane parallel to and facing each incident surface PIa, PIb, PIc, or PId.

At the display surface 3PE of the display panel 3, the light guiding members 10a, 10b, 10c, and 10d are disposed in this order from the upward direction U to the downward direction D. The incident surfaces PIa, PIb, PIc, and PId of the light guiding members 10a, 10b, 10c, and 10d are parallel to and face the display surface 3PE and are in contact with the display surface 3PE. Owing to such a structure, the display surface 3PE of the display panel 3, the incident surfaces PIa, PIb, PIc, and PId, and the irradiation surfaces PEa, PEb, PEc, and PEd are all parallel to one another.

In the present embodiment, each of the light guiding members 10a, 10b, 10c, and 10d is a bundle of a plurality of optical fibers 11 as illustrated in FIG. 4. One side surface of the optical fiber 11 serves as the incident surface PIa, PIb, PIc, or PId and the other side surface of the optical fiber 11 serves as the irradiation surface PEa, PEb, PEc, or PEd. The light emitted from the display surface 3PE of the display panel 3 and entered via the incident surfaces PIa, PIb, PIc, and PId is repeatedly reflected in each of optical fibers 11 and then emitted from the irradiation surfaces PEa, PEb, PEc, and PEd. Owing to such a structure, an image displayed on the display surface 3PE of the display panel 3 is emerged on the irradiation part PE of the light guiding unit 10.

In the plurality of light guiding members 10a, 10b, 10c, and 10d, distances from the incident surfaces PIa, PIb, PIc, and PId to respective irradiation surfaces PEa, PEb, PEc, and PEd become shorter in a direction from the upward U to the downward D. Thereby, the light guiding unit 10 has a structure in which the irradiation surfaces PEa, PEb, PEc, and PEd become closer to the display surface 3PE in a direction from the upward U to the downward D of the display surface 3PE of the display panel 3. Namely, the positions of the irradiation surfaces PEa, PEb, PEc, and PEd go away from the display surface 3PE in a direction from the downward D to the upward U. The optical fibers composing the light guiding members 10a, 10b, 10c, and 10d have different lengths for respective irradiation surfaces PEa, PEb, PEc, and PEd.

The irradiation part PE of the light guiding unit 10 has a shape in which the plurality of irradiation surfaces PEa, PEb, PEc, and PEd are combined in a step-like manner. The plurality of irradiation surfaces PEa, PEb, PEc, and PEd have different distances from the display surface 3PE stepwisely changing in a vertical direction (UD or DU direction) of the display panel 3. Specifically, as illustrated in FIG. 3, the plurality of irradiation surfaces Pea, PEb, PEc, and PEd have distances from the display surface 3PE stepwisely increasing from the downward D to the upward U of the display panel 3.

As illustrated in FIG. 5, the display surface 3PE is sectioned into a plurality of regions 3PEa, 3PEb, 3PEc, and 3PEd, which are facing respective incident surfaces PIa, PIb, PIc, and PId of light guiding members 10a, 10b, 10c, and 10d. Now, it is assumed that images as illustrated in FIG. 5 are displayed on each of regions 3PEa, 3PEb, 3PEc, and 3PEd of the display surface 3PE. An image displayed on the region 3PEa enters from the incident surface PIa of the light guiding member 10a facing the region 3PEa. An image displayed on the region 3PEb enters from the incident surface PIb of the light guiding member 10b facing the region 3PEb. An image displayed on the region 3PEc enters from the incident surface PIc of the light guiding member 10c facing the region 3PEc. An image displayed on the region 3PEd enters from the incident surface PId of the light guiding member 10d facing the region 3PEd.

The images displayed on each of the regions 3PEa, 3PEb, 3PEc, and 3PEd are displayed on each of the irradiation surfaces PEa, PEb, PEc, and PEd of respective light guiding members 10a, 10b, 10c, and 10d as illustrated in FIG. 6. The distances of irradiation surfaces PEa, PEb, PEc, and PEd from the display surface 3PE become longer from the downward D to the upward. When viewed the irradiation surfaces PEa, PEb, PEc, and PEd from a same view point, as the distance from the display surface 3PE becomes longer, the distance from the same view point becomes closer. Therefore, the images displayed on the irradiation surfaces PEa, PEb, PEc, and PEd become bigger as it goes to the upward direction. As a result, as illustrated in FIG. 6, the images displayed on each of the irradiation surfaces PEa, PEb, PEc, and PEd become smaller in the order from the irradiation surface PEa whose distance from the display surface 3PE is the longest to the irradiation surface PEd whose distance from the display surface 3PE is the shortest. Namely, the images displayed on each of the irradiation surfaces PEa, PEb, PEc, and PEd become smaller from the upward to the downward.

In the light guiding unit 10, the irradiation surfaces PEa, PEb, PEc, and PEd included in the irradiation part PE have distances from the display surface 3PE which become longer from the downward D to the upward U. Therefore, the light pass length from the irradiation surface to the mirror 4 as illustrated in FIG. 1 becomes longer in the order from the most downward irradiation surface PEd to the most upward irradiation surface PEa. As a result, it is possible to configure the light guiding unit 10 so that the light pass length k2 of the light pass K2 is shorter than the light pass length c2 of the light pass C2, and the light pass length j2 of the light pass J2 is longer than the light pass length c2 of the light pass C2, as illustrated in FIG. 1. Thereby, the display device 1 employing the light guiding unit 10 can display the virtual image PG in a parallel or almost parallel manner relative to the road surface. For example, the display device 1 employing the light guide unit 10 can display the virtual image PG having an approximately trapezoidal shape in which the size of image to be displayed becomes smaller as it goes away from the driver DR. Thus, the display device 1 employing the light guiding unit 10 can display the virtual image appropriately on the road surface.

In the light guiding unit 10, respective irradiation surfaces PEa, PEb, PEc, and PEd included in the step-like irradiation part PE, respective incident surfaces PIa, PIb, PIc, and PId included in the incident part PI, and the display surface 3PE are parallel to each other. By employing such a light guiding unit 10, it is possible to configure, arrange or dispose the display panel 3 so that respective light passes C2, J2, and K2 from the display surface 3PE to the mirror 4 are parallel to the direction orthogonal to the display surface 3PE. As a result, the display panel 3 has a relatively small viewing angle. Furthermore, it is possible to prevent the transmittance and the contrast from decreasing or dropping. Furthermore, the display device 1 including the light guiding unit 10 makes it possible to reduce the limitation or restriction due to a wide viewing angle of the display panel 3 in displaying the virtual image PG.

The number of the light guiding members, which are vertically arranged (in a direction parallel to the direction from the upward U to the downward D) as 10a, 10b, 10c, and 10d for example, is not limited to the present embodiment. It is preferable to increase the number of the light guiding members, since the virtual image PG becomes smoother. A modification of the present embodiment will now be described.

<1-3. First Modification>

Figure 8:
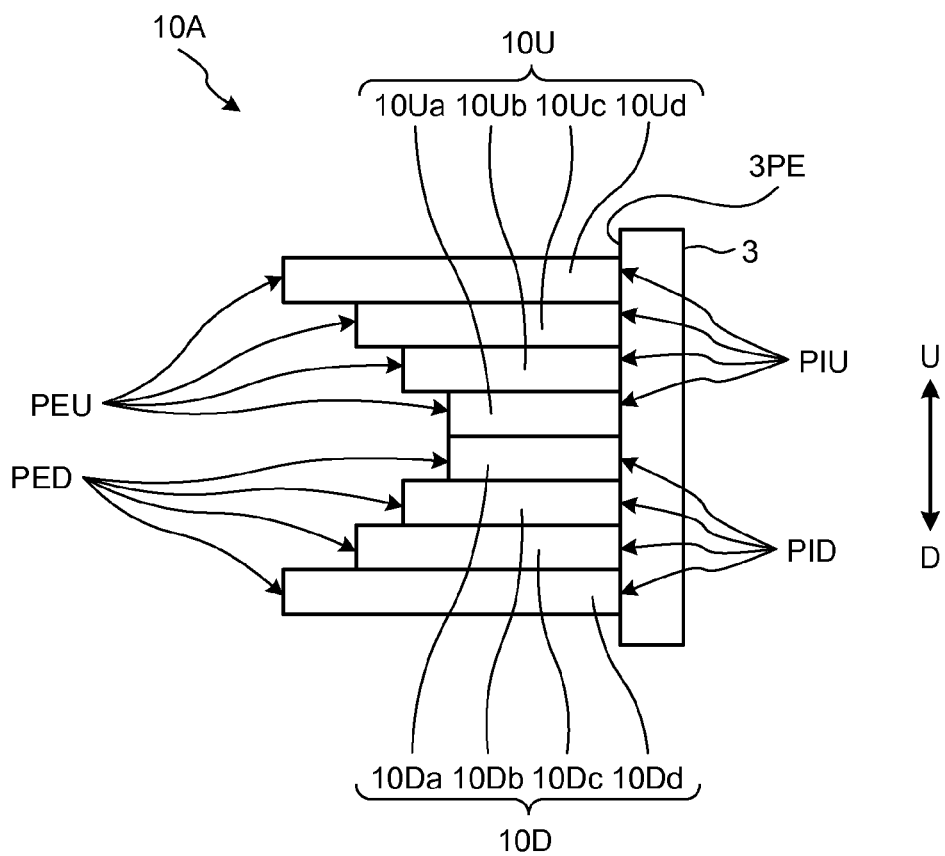
FIG. 8 is a side view illustrating a display panel and a light guiding unit according to a first modification of the present embodiment.
Figure 9:
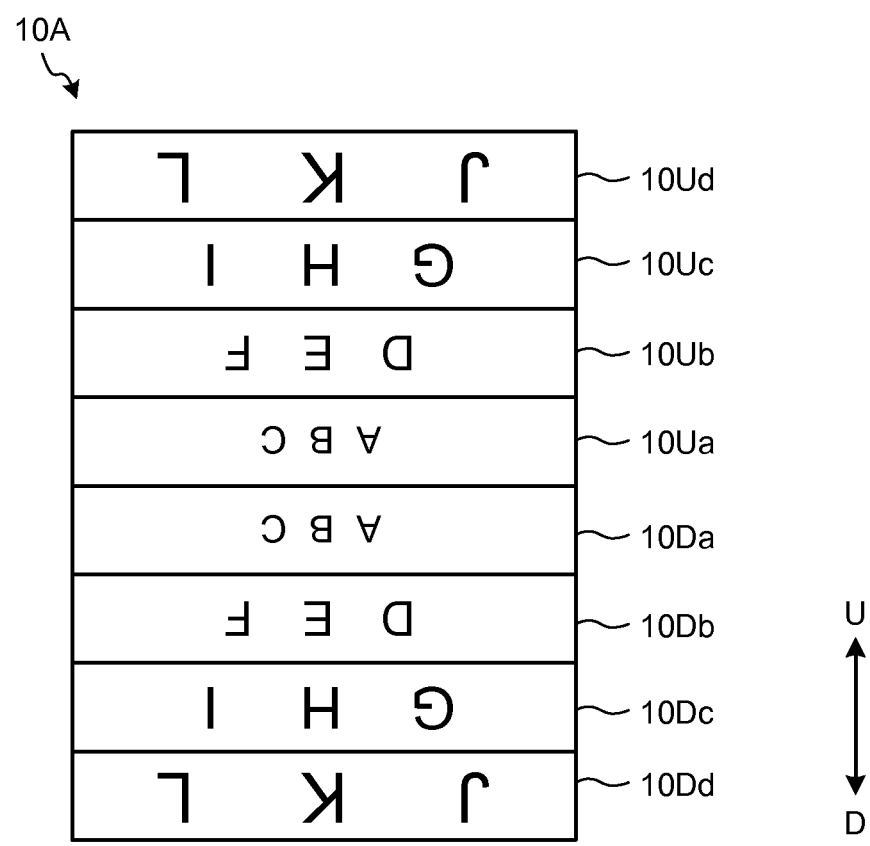
FIG. 9 is front view illustrating the light guiding unit according to the first modification of the present embodiment.
Figure 10:
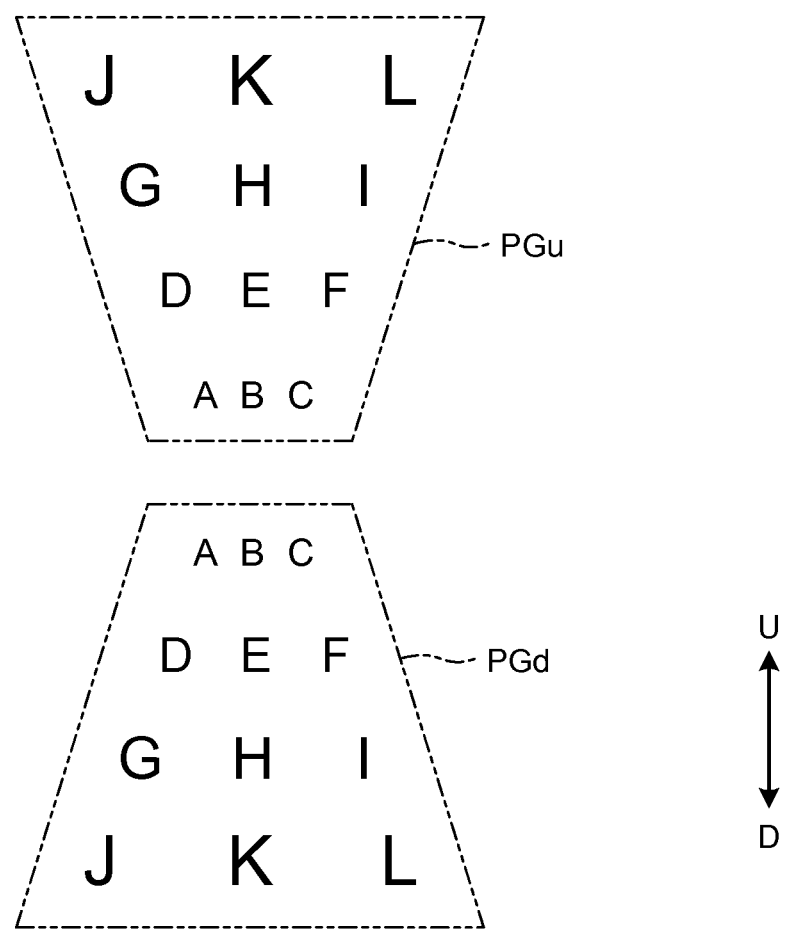
FIG. 10 is a schematic view illustrating virtual images displayed by the display device according to the first modification of the present embodiment.

FIG. 8 is a side view illustrating a display panel and a light guiding unit according to a first modification of the present embodiment. FIG. 9 is a front view illustrating the light guiding unit according to the first modification of the present embodiment. FIG. 10 is a schematic view illustrating virtual images displayed by the display device according to the first modification of the present embodiment. In the first modification, the light guiding unit 10A includes an upper light guiding unit 10U and a lower light guiding unit 10D. The light guiding unit 10A is disposed at a display surface side 3PE of the display panel 3. The upper light guiding unit 10U is disposed at an upper part of the light guiding unit 10A. The lower light guiding unit 10D is disposed at a lower part of the light guiding unit 10A. The upper light guiding unit 10U and the lower light guiding unit 10D are symmetrically disposed relative to a vertical center portion of the display panel 3.

The upper light guiding unit 10U includes a plurality of light guiding members 10Ua, 10Ub, 10Uc, and 10Ud. The plurality of light guiding members 10Ua, 10Ub, 10Uc, and 10Ud are disposed in this order from the downward D to the upward U. In the plurality of light guiding members 10Ua, 10Ub, 10Uc, and 10Ud, distances of respective irradiation surfaces PEU from the display surface 3PE of the display panel 3 become longer in this order (from downward D to upward U). Respective incident surfaces PIU of the plurality of light guiding members 10Ua, 10Ub, 10Uc, and 10Ud are in contact with the display surface 3PE of the display panel 3.

The lower light guiding unit 10D includes a plurality of light guiding members 10Da, 10Db, 10Dc, and 10Dd. The plurality of light guiding members 10Da, 10Db, 10Dc, and 10Dd are disposed in this order from the upward U to the downward D. In the plurality of light guiding members 10Da, 10Db, 10Dc, and 10Dd, distances of respective irradiation surfaces PED from the display surface 3PE of the display panel 3 become longer in this order (from upward U to downward U). Respective incident surfaces PID of the plurality of light guiding members 10Da, 10Db, 10Dc, and 10Dd are in contact with the display surface 3PE of the display panel 3.

In such a structure of the light guiding unit 10A, the light guiding members 10Ua and 10Da, which are disposed at the vertically most central portion of the display panel 3, are shortest, and the distances of the irradiation surfaces PEU, PED from the display surface 3PE become longer as light guiding members go away from the central portion upward or downward direction. An image displayed on the irradiation surfaces PEU of the upper light guiding unit 10U of the light guiding unit 10A becomes bigger in the order from the light guiding members 10Ua, 10Ub, 10Uc, and 10Ud from the downward D to the upward U, as illustrated in FIG. 9. An image displayed on the irradiation surfaces PED of the lower light guiding unit 10D of the light guiding unit 10A becomes bigger in the order from the light guiding members 10Da, 10Db, 10Dc, and 10Dd from the upward U to the downward D, as illustrated in FIG. 9.

The display device 1 including the light guiding unit 10A displays a virtual image PGd at a lower side D, and displays a virtual image PGu at an upper side U, as illustrated in FIG. 10. The virtual image PGd at the lower side D is through the lower light guiding unit 10D. The virtual image PGu at the upper side U is through the upper light guiding unit 10U. The virtual images PGd and PGu are trapezoidal or nearly trapezoidal images in which the image to be displayed becomes smaller as the distance from the driver DR becomes longer. Thus, the display device 1 including the light guiding unit 10A can display the virtual images PGd and PGu respectively at the lower side D and the upper side U. Therefore, it is possible to improve the flexibility in displaying the information.

<1-4. Second Modification>

Figure 11:
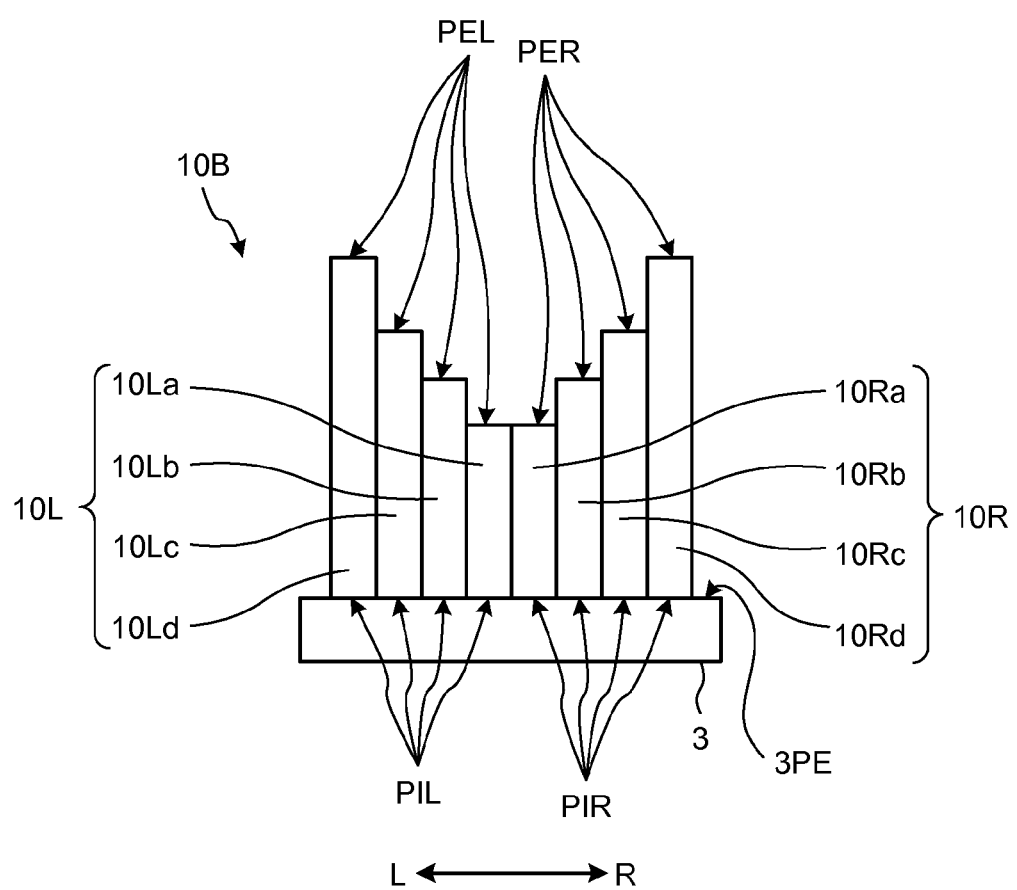
FIG. 11 is a plan view illustrating a display panel and a light guiding unit according to a second modification of the present embodiment.

FIG. 11 is a plan view illustrating a display device and a light guiding unit according to a second modification of the present embodiment. In the second modification, a light guiding unit 10B includes a left light guiding unit 10L and a right light guiding unit 10R. The light guiding unit 10B is disposed at the display surface 3PE side of the display panel 3. The left light guiding unit 10L is disposed at a left side L. The right light guiding unit 10R is disposed at a right side R. The left light guiding unit 10L and the right light guiding unit 10R are symmetrically disposed relative to a horizontal central portion of the display panel 3. In this modification, the horizontal direction (left-right direction) means a direction orthogonal to the vertical direction (up-down direction) of the image displayed by the display panel 3. In this modification, the left side L and the right side R are based on the display panel 3 when viewed from the upward U.

The left light guiding unit 10L includes a plurality of light guiding members 10La, 10Lb, 10Lc, and 10Ld. The plurality of light guiding members 10La, 10Lb, 10Lc, and 10Ld are disposed in this order from the right side R to the left side L. In the plurality of light guiding members 10La, 10Lb, 10Lc, and 10Ld, distances of the irradiation surfaces PEL from the display surface 3PE of the display panel 3 become longer in this order. Respective incident surfaces PIL of the plurality of light guiding members 10La, 10Lb, 10Lc, and 10Ld are in contact with the display surface 3PE of the display panel 3.

The right light guiding unit 10R includes a plurality of light guiding members 10Ra, 10Rb, 10Rc, and 10Rd. The plurality of light guiding members 10Ra, 10Rb, 10Rc, and 10Rd are disposed in this order from the left side L to the right side R. In the plurality of light guiding members 10Ra, 10Rb, 10Rc, and 10Rd, distances of the irradiation surfaces PER from the display surface 3PE of the display panel 3 become longer in this order. Respective incident surfaces PIR of the plurality of light guiding members 10Ra, 10Rb, 10Rc, and 10Rd are in contact with the display surface 3PE of the display panel 3.

In such a structure of the light guiding unit 10B, distances of the irradiation surfaces PEL of the left light guiding unit 10L and the irradiation surfaces PER of the right light guiding unit 10R from the display surface 3PE change stepwisely in a direction (left-right direction) orthogonal to the vertical direction (up-down direction) of the image displayed by the display device 3. More specifically, in the light guiding unit 10B, the light guiding members 10La and 10Ra, which are disposed at the horizontally most central portion of the display panel 3, are shortest, and the distances of the irradiation surfaces PEL, PER from the display surface 3PE become longer as light guiding members go away from the central portion to the left L or right R direction.

An image displayed on the irradiation surfaces PEL of the left light guiding unit 10L of the light guiding unit 10B becomes bigger in the order from the light guiding members 10La, 10Lb, 10Lc, and 10Ld in a direction from the right side R to the left side L. An image displayed on the irradiation surfaces PER of the right light guiding unit 10R of the light guiding unit 10B becomes bigger in the order from the light guiding members 10Ra, 10Rb, 10Rc, and 10Rd from the left side L to the right side R.

The display device 1 including the light guiding unit 10B displays virtual images respectively at the left side L and the right side R. The virtual image at the left side L is through the left light guiding unit 10L. The virtual image at the right side R is through the right light guiding unit 10R. The virtual images at the left and right sides become bigger as the image to be displayed goes away from the central position of the driver DR's viewing line. Thus, the display device 1 including the light guiding unit 10B can display the virtual images respectively at the left side L and the right side R. Therefore, it is possible to improve the flexibility in displaying the information.

<1-5. Third Modification>

Figure 12:
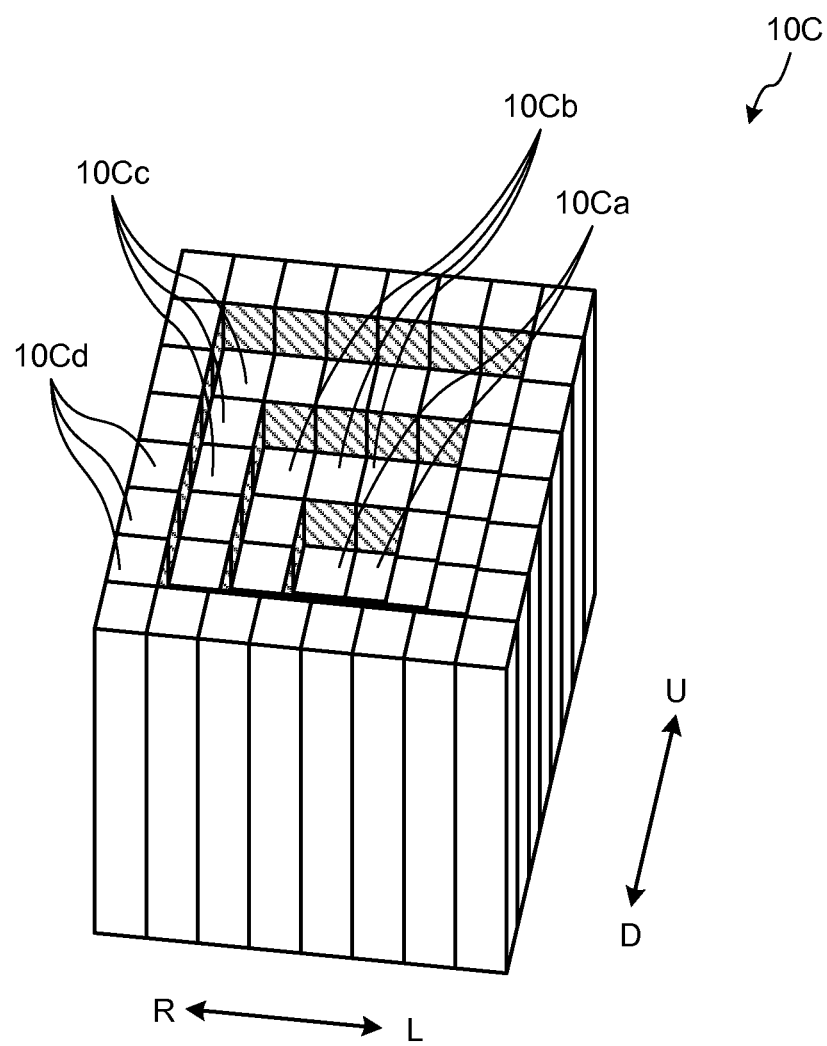
FIG. 12 is a perspective view illustrating a display panel and a light guiding unit according to a third modification of the present embodiment.

FIG. 12 is a perspective view illustrating a display panel and a light guiding unit according to a third modification of the present embodiment. The light guiding unit 10C according to the third modification is a combination of the light guiding unit 10A according to the first modification and the light guiding unit 10B according to the second modification. The light guiding unit 10C includes a plurality of light guiding members 10Ca, 10Cb, 10Cc, and 10Cd, which are disposed at the display surface side of the display panel 3. A plurality of light guiding members 10Ca is disposed at a central portion of the display surface of the display panel 3. A plurality of light guiding members 10Cb whose length is longer than that of the light guiding members 10Ca are disposed around the light guiding members 10Ca. A plurality of light guiding members 10Cc whose length is longer than that of the light guiding members 10Cb are disposed around the light guiding members 10Cb. A plurality of light guiding members 10Cd whose length is longer than that of the light guiding members 10Cc are disposed around the light guiding members 10Cc. Thus, the light guiding unit 10C has a four-sided pyramid-like structure with the plurality of light guiding members 10Ca, 10Cb, 10Cc, and 10Cd. In respective light guiding members 10Ca, 10Cb, 10Cc, and 10Cd, first side surfaces in contact with the display surface of the display panel 3 are parallel to second side surfaces opposite to the first surfaces.

The display device 1 including the light guiding unit 10C can display virtual images at an upper side U, a lower side D, a left side L and a right side R. Thus, it is possible to improve the flexibility in displaying the information.

The display device according to the present disclosure includes a light guiding unit in which a step-like shaped irradiation part PE, incident part, the display surface of the display panel are parallel to each other. By disposing such a light guiding unit at the display surface side of the display panel, the display panel can make each light pass from the display surface to the mirror parallel to a direction orthogonal to the display surface. Therefore, there is no need to incline the display panel toward the road surface. Thus, it is possible to dispose the display panel approximately vertically to the road surface. As a result, according to the present disclosure, it is possible to reduce the restriction or limitation due to the wide viewing angle of the display panel in displaying a virtual image. It is also possible to prevent the reduction of the transmittance or contrast of the display panel. Thus, it is possible to display a virtual image appropriately on a road surface by applying the display device according to the present disclosure to a head-up display device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

[2. Configuration of Present Disclosure]

The present disclosure can take the following configurations.

(1) A display device comprising:
a display panel having a display surface;
a light guiding unit disposed at a display surface side of the display panel, the light guiding unit having an incident part and an irradiation part,
the incident part being parallel to the display surface and facing the display surface,
the irradiation part being parallel to the display surface and configured to emit a light entered from the incident part, the irradiation part having a plurality of irradiation surfaces whose positions in a direction orthogonal to the incident part differ depending on a position on the display surface; and
a mirror configured to reflect an image projected from the display panel through the light guiding unit.

(2) The display device according to (1), wherein
the irradiation part has a shape in which the plurality of irradiation surfaces are combined in a step-like manner.

(3) The display device according to (2), wherein
distances of the plurality of irradiation surfaces from the display surface differ stepwisely in a vertical direction of the display panel.

(4) The display device according to (3), wherein
distances of the plurality of irradiation surfaces from the display surface increase stepwisely from lower side to upper side of the display panel.

(5) The display device according to (2), wherein
distances of the plurality of irradiation surfaces from the display surface differ stepwisely in a direction orthogonal to a vertical direction of an image displayed by the display panel.

(6) The display device according to (1), wherein
the light guiding unit comprises a plurality of optical fibers.

(7) The display device according to (6), wherein
lengths of the optical fiber differ depending on the plurality of irradiation surfaces.

(8) The display device according to (1), wherein
the display surface, the incident part, and each of the irradiation surfaces are planes.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display panel having a display surface;
a light guiding unit disposed at a display surface side of the display panel, the light guiding unit having an incident part and an irradiation part,
the incident part being parallel to the display surface and facing the display surface,
the irradiation part being parallel to the display surface and configured to emit a light entered from the incident part, the irradiation part having a plurality of irradiation surfaces whose positions in a direction orthogonal to the incident part differ depending on a position on the display surface; and a mirror configured to reflect an image projected from the display panel through the light guiding unit, wherein the light guiding unit comprises a plurality of optical fibers, and lengths of the optical fibers differ depending on the plurality of irradiation surfaces.

2. The display device according to claim 1, wherein the irradiation part has a shape in which the plurality of irradiation surfaces are combined in a step-like manner.

3. The display device according to claim 2, wherein distances of the plurality of irradiation surfaces from the display surface differ stepwisely in a vertical direction of the display panel.

4. The display device according to claim 3, wherein distances of the plurality of irradiation surfaces from the display surface increase stepwisely from lower side to upper side of the display panel.

5. The display device according to claim 2, wherein distances of the plurality of irradiation surfaces from the display surface differ stepwisely in a direction orthogonal to a vertical direction of an image displayed by the display panel.

6. The display device according to claim 1, wherein the display surface, the incident part, and each of the irradiation surfaces are planes.

* * * * *